UNITED STATES PATENT OFFICE.

THOMAS GURNEY, OF CHELSEA, MASSACHUSETTS.

FIRE-PROOF COMPOSITION FOR SAFES, &c.

SPECIFICATION forming part of Letters Patent No. 259,532, dated June 13, 1882.

Application filed March 13, 1882. (No specimens.)

*To all whom it may concern:*

Be it known that I, THOMAS GURNEY, of Chelsea, in the county of Suffolk, of the State of Massachusetts, have invented a new and useful Improvement in Fire-Proof Compositions for Safes, &c.; and I do hereby declare the same to be described as follows, viz:

The composition constituting my said invention consists of twenty parts (by weight) of the material termed "diatomic" or "infusorial" earth; nine parts (by weight) of silica, silicates, or silicic acid; five parts (by weight) of asbestus; two parts (by weight) of sulphuric acid diluted with sixteen parts (by weight) of water; one part (by weight) of fire-clay.

The infusorial earth should be thoroughly mixed with the acid solution, and during twenty-four hours the mixture should be occasionally agitated or stirred, after which the silica, asbestus, and fire-clay are to be added with sufficient water to bring the whole into a molding or plastic state.

This composition may be employed to advantage in the manufacture of fire-proof safes or boxes, or various other structures required to be rendered fire resisting or fire proof.

I do not confine my invention to the precise proportions, as hereinbefore stated, of its ingredients, as such may be somewhat varied without changing the character of the composition. Preparatory to being used for some purposes it may be baked or indurated by heat.

I would further remark that I am aware that it is not new to make for fire-proof safes a wall-filling consisting of chalk, clay, sawdust, and silicate of soda; also, that it is not new to make a box of asbestus board, and to apply to the joints and corners thereof a cement composed of silicate of soda in solution with silicate of magnesia. I am also aware that it is not new to saturate asbestus board with silicate of soda, and to rub talc or silicate of magnesia on the surface of such board so saturated, all of which differs materially from my invention, as I employ in the making of my composition infusorial earth, and with the silica, asbestus, and fire-clay I use a solution of sulphuric acid, which serves to connect the several ingredients and to so modify the infusorial earth as to render it incombustible. Furthermore, as the asbestus is in a fibrous condition, it, besides being fire-resisting, holds together very strongly the clay and infusorial earth, the solution being used also as a binding element with the clay, and operates to greatly indurate the composition when it is dried.

What I claim as my invention is—

The fire-resisting composition substantially as described, consisting of infusorial earth, silica, asbestus, diluted sulphuric acid, and fire-clay, mixed or combined essentially as set forth.

THOMAS GURNEY.

Witnesses:
R. H. EDDY,
E. B. PRATT.